United States Patent [19]

Wilson et al.

[11] Patent Number: 4,702,883
[45] Date of Patent: Oct. 27, 1987

[54] RECONSTITUTABLE FUEL ASSEMBLY HAVING REMOVABLE UPPER STOPS ON GUIDE THIMBLES

[75] Inventors: John F. Wilson, Murrysville Boro; David D. Seel, Monroeville; James M. Pepka, Plum Boro, all of Pa.

[73] Assignee: Westinghouse Electric Corp., Pittsburgh, Pa.

[21] Appl. No.: 762,734

[22] Filed: Aug. 5, 1985

[51] Int. Cl.[4] .............................................. G21C 3/32
[52] U.S. Cl. .................................... 376/446; 376/353
[58] Field of Search ................................. 376/446, 353

[56] References Cited

U.S. PATENT DOCUMENTS 4,269,661  5/1981  Kmonk ................................. 376/446
4,323,428  4/1982  Schallenberger ..................... 376/364
4,376,092  3/1983  Kmonk et al. ....................... 376/353

Primary Examiner—Donald P. Walsh

[57] ABSTRACT

The hold-down plate of the top nozzle of a fuel assembly is removably attached on the upper extension members of the fuel assembly guide thimbles by an improved structure associated with passageways through the hold-down plate which receive upper end portions of the guide thimble upper extension members. The improved attaching structure includes recesses on the upper end portions of the guide thimble extension members with the recesses terminating at upper terminal edges thereof, elements mounted in the upper hold-down plate and extending therefrom into the passageways of the plate and the recesses of the extension member upper end portions, and a plurality of stop members connectable on the upper end portions of the guide thimble extension members and having overhanging ledges respectively formed thereon which define upper limits of the respective recesses on the extension member upper end portions. The elements are positioned to slide upwardly along the corresponding recesses until making engagement with the ledges on the stop members when the stop members are connected on the corresponding extension member upper end portions for limiting upward movement of the upper hold-down plate along the guide thimble. Also, the elements are positioned to slide upwardly along and past the corresponding recesses when the stop members have been disconnected from the corresponding extension member upper end portions for allowing removal of the upper hold-down plate from the guide thimble.

6 Claims, 6 Drawing Figures

RECONSTITUTABLE FUEL ASSEMBLY HAVING REMOVABLE UPPER STOPS ON GUIDE THIMBLES

CROSS REFERENCE TO RELATED APPLICATIONS

Reference is hereby made to the following copending applications dealing with related subject matter and assigned to the assignee of the present invention:

1. "Reconstitutable Nuclear Reactor Fuel Assembly With Unitary Removable Top Nozzle Subassembly" by John M. Shallenberger, assigned U.S. Ser. No. 673,681 and filed Nov. 20, 1984, a continuation-in-part of U.S. application Ser. No. 457,790, filed Jan. 13, 1983.

2. "Improved Top Nozzle And Guide Thimble Joint Structure In A Nuclear Fuel Assembly" by John F. Wilson et al., assigned U.S. Ser. No. 711,433 and filed Mar. 13, 1985.

BACKGROUND OF THE INVENTION

1. Field of the Invention

The present invention relates generally to fuel assemblies for nuclear reactors and, more particularly, is concerned with improved features for removably attaching the top nozzle on the guide thimbles of a fuel assembly for facilitating reconstitution thereof.

2. Description of the Prior Art

Conventional designs of fuel assemblies include a multiplicity of fuel rods held in an organized array by grids spaced along the fuel assembly length. The grids are attached to a plurality of control rod guide thimbles. Top and bottom nozzles on opposite ends of the fuel assembly are secured to the control rod guide thimbles which extend above and below the opposite ends of the fuel rods. At the top end of the fuel assembly, the guide thimbles are attached in openings provided in the top nozzle. Conventional fuel assemblies also have employed a fuel assembly hold-down device to prevent the force of the upward coolant flow from lifting a fuel assembly into damaging contact with the upper core support plate of the reactor, while allowing for changes in fuel assembly length due to core induced thermal expansion and the like. Such hold-down devices have included the use of springs surrounding the guide thimbles, such as seen in U.S. Pat. No. 3,770,583 (U.S. Pat. No. Re. 31,583) and U.S. Pat. No. 3,814,667 to Klumb et al. and U.S. Pat. No. 4,269,661 to Kmonk et al.

During operation of such assembly in a nuclear reactor, the fuel rods may occasionally develop cracks along their length resulting primarily from internal stresses, thus establishing the possibility that fission products having radioactive characteristics may seep or otherwise pass into the primary coolant of the reactor. In view of the high costs associated with replacing fuel assemblies containing failed fuel rods, both domestic and foreign utilities have indicated an interest in reconstitutable fuel assemblies in order to minimize their operating and maintenance expenses.

Conventional reconstitutable fuel assemblies incorporate design features arranged to permit the removal of individual failed fuel rods, the option to replace rods, followed by the additional use in the reactor and/or normal handling and storage of the affected fuel assembly. Reconstitution has been made possible by providing a fuel assembly with a removable top nozzle. The top nozzle is mechanically fastened usually by a threaded arrangement to the upper end of each control rod guide thimble assembly, and the top nozzle can be removed remotely from an irradiated fuel assembly while it is still submerged in neutron-absorbing liquid. With rod removal/replacement and after the top nozzle has been remounted on the control rod guide thimbles, the reconstituted assembly can then be reinserted into the reactor and used until the end of its useful life, and/or stored in spent fuel pools or other places in a safe, normal manner.

The above-cross referenced patent applications describe and illustrate reconstitutable fuel assemblies having different arrangements for removably attaching the top nozzle to the upper ends of the guide thimbles. When given the task to modify a preexisting fuel assembly wherein the top nozzle is not readily removable, prior top nozzle removable attachment arrangements such as those of the cross-referenced applications are instructive of possible approaches, but do not necessarily point toward the direction one should take to make the required modification in the simplest and least costly way. Consequently, a need exists for a fresh approach tailored to the particular preexiting top nozzle attachment structure, one which will achieve removability of the top nozzle with the minimum change in the design of preexisting parts.

SUMMARY OF THE INVENTION

The present invention provides improved features designed to make a preexisting top nozzle attachment structure removable in a manner which satisfies the aforementioned needs. In the preexisting structure, axially extending recesses having upper and lower ledges were machined into the upper portions of the guide thimble extensions and received radial pins inserted in the upper hold-down plate of the top nozzle to form an upper limit to hold-down plate travel and to support the weight of the fuel assembly during lifting. In order to remove the top nozzle, these pins had to be removed which was a tedious operation. The present invention introduces a simple change to each of the guide thimble extensions which makes the upper hold-down plate and thus the top nozzle readily removable from the guide thimbles. The upper end of each guide thimble extension is modified to form a removable stop which defines the upper ledge of the recess. Each stop interacts with one of the hold-down plate radial pins to form the upper limit for travel of the hold-down plate along the respective guide thimble extension. The lower portion of the stop having a reduced diameter compared to the upper portion thereof is externally threaded in order to be threadably received into an internally threaded section on the upper end of the remainder of the guide thimble extension. By unthreading the stop from the respective guide thimble extension, the upper hold-down plate can be removed form the guide thimbles.

Accordingly, the present invention is provided in a nuclear fuel assembly having at least one control rod guide thimble and a top nozzle, wherein the guide thimble includes an upper extension member and the top nozzle includes an upper hold-down plate having a passageway slidably receiving an upper end portion of the extension member. The present invention is directed to an improved structure for removably attaching the upper hold-down plate on the guide thimble upper extension member. The improved attaching structure basically comprises: (a) means defining a recess on the upper end portion of the extension member; (b) a stop member having upper and lower portions, with the stop member lower portion adapted to connect on the extension member upper end portion and the stop member upper portion having an outside diameter greater than that of the stop member lower portion and extending above the extension member upper end portion when the stop member lower portion is connected on the same, and the stop member also having a ledge formed thereon at a transition between its upper and lower portions which defines an upper limit of the recess when the stop member is connected on the extension member upper end portion; and (c) an element mounted in the upper hold-down plate and extending therefrom into the passageway of the plate and the recess of the extension member upper end portion, with the element being positioned to slide upwardly along the recess until making engagement with the ledge on the stop member when the stop member is connected on the extension member upper end portion for limiting upward movement of the upper hold-down plate along the guide thimble and the element being positioned to slide upwardly along and past the recess when the stop member has been disconnected from the extension member upper end portion for allowing removal of the upper hold-down plate from the guide thimble.

More particularly, the upper end portion of the extension member has means defining a threaded section on the interior thereof, whereas the stop member lower portion has a complementary threaded section defined on the exterior thereof adapted to threadably fit into the threaded section of the extension member upper end portion for releasably connecting the stop member on the guide thimble extension member. Further, the recess terminates at an upper terminal edge of the guide thimble extension member upper end portion.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
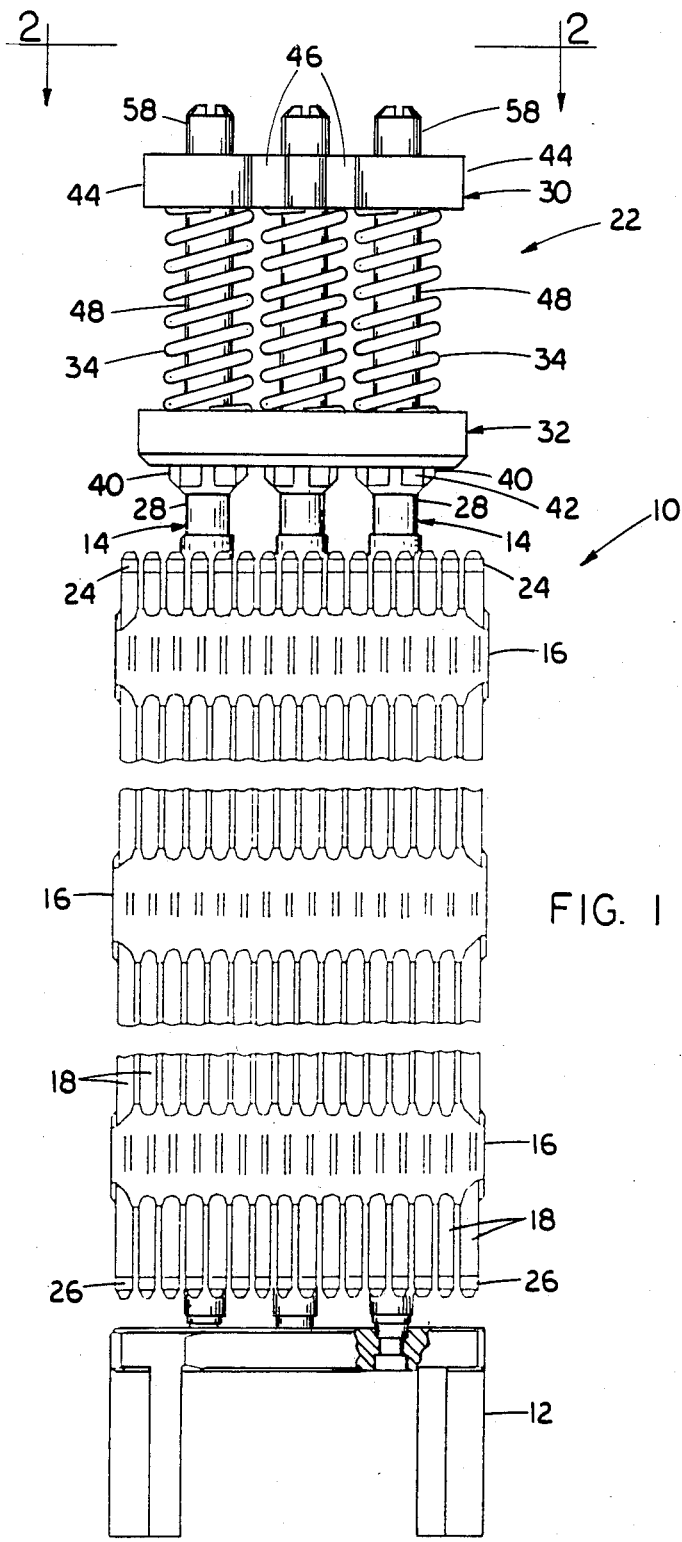
FIG. 1 is an elevational view, with parts broken away for clarity, of a fuel assembly incorporating the improved features of the present invention.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown an elevational view of a reconstitutable nuclear reactor fuel assembly, represented in vertically foreshortened form and being generally designated by the numeral 10. Basically, the fuel assembly 10 includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14 which incorporates certain improved features in accordance with the present invention which will be fully described below. With such arrangements of parts, the fuel assembly 10 forms an integral unit capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets (not shown) and is closed at its opposite ends by upper and lower end plugs 24,26. The fuel pellets composed of fissile material are responsible for creating the reactive power of the reactor. A liquid moderator/coolant such as water, or water containing boron, is pumped upwardly through the guide thimbles 14 and along the fuel rods 18 of the fuel assembly 10 in order to extract heat generated therein for the production of useful work.

To control the fission process, a number of control rods (not shown) are reciprocally movable in the guide thimbles 14 located at predetermined positions in the fuel assembly 10. Since the control rods are inserted into the guide thimbles 14 from the top of the fuel assembly 10, the placement of the components of the top nozzle 22 which attach to the guide thimbles 14 must accommodate the movement of the control rods into the guide thimbles from above the top nozzle.

Top Nozzle and Guide Thimble Mounting Arrangement

Turning now to FIGS. 1 to 4, there is shown the components of the top nozzle 22 which interconnect with the guide thimbles 14. The top nozzle 22, which is mounted to upper hollow tubular extension members 28 of the respective guide thimbles 14, includes an upper hold-down plate 30, a lower adapter plate 32, and a plurality of hold-down coil springs 34 disposed between the upper and lower plates 30,32. The upper hold-down plate 30 has a plurality of passageways 36 defined therethrough, while the lower adapter plate 32 has a plurality of openings 38, the passageways 36 and openings 38 being arranged in respective patterns which are matched to that of the guide thimbles 14 of the fuel assembly 10.

More particularly, the upper tubular extension members 28 of the guide thimbles 14 extend upwardly and are slidably inserted through the respective openings 38 in the lower adapter plate 32 and the respective passageways 36 in the upper hold-down plate 30. The hold-down springs 34 are inserted about the respective extension members 28 and displace the upper hold-down plate 30 above the lower adapter plate 32. A plurality of lower retainers 40 are attached, such as by brazing, to the guide thimble extension members 28 below the lower adapter plate 32 for limiting downward slidable movement of the adapter plate 32 relative to the guide thimbles 14 and thereby supporting the adapter plate at a stationary position along the guide thimbles. Each lower retainer 40 on one guide thimble 14 has a series of scallops 42 formed on its periphery which are aligned with those of the fuel rods 18 grouped about the respective one guide thimble 14 so that the fuel rods may be removed and replaced during reconstitution of the fuel assembly 10.

Figure 2:
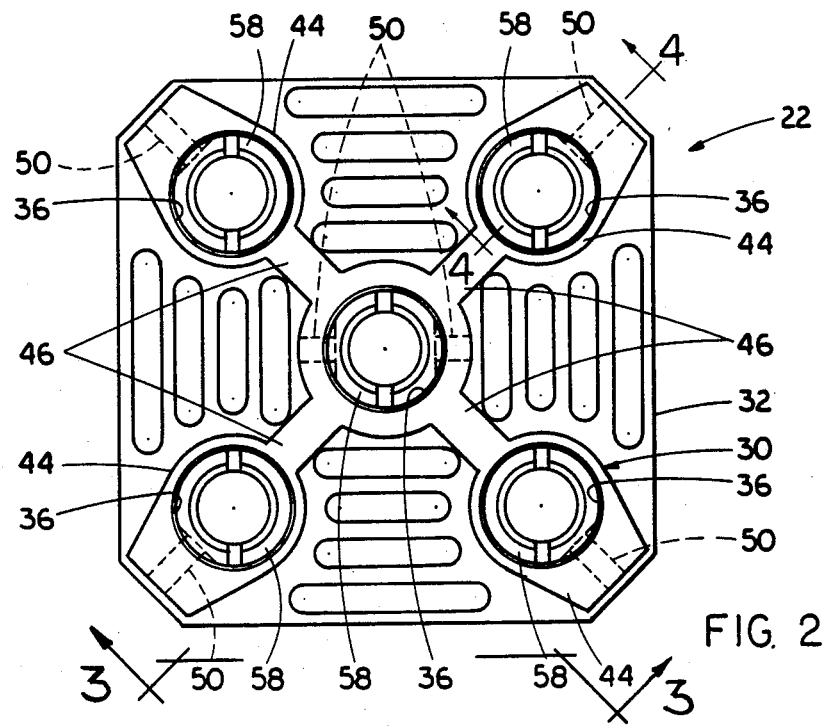
FIG. 2 is an enlarged to P plan view of the fuel assembly as seen along line 2—2 of FIG. 1.

As seen particularly in FIG. 2, the upper hold-down plate 30 is composed of an array of hubs 44 and radially-arranged spokes or ligaments 46 which extend between and interconnect the hubs. Each of the hubs 44 has one of the passageways 36 defined therethrough.

Improved Features for Removably Attaching Top Nozzle on Guide Thimbles

Figure 3:
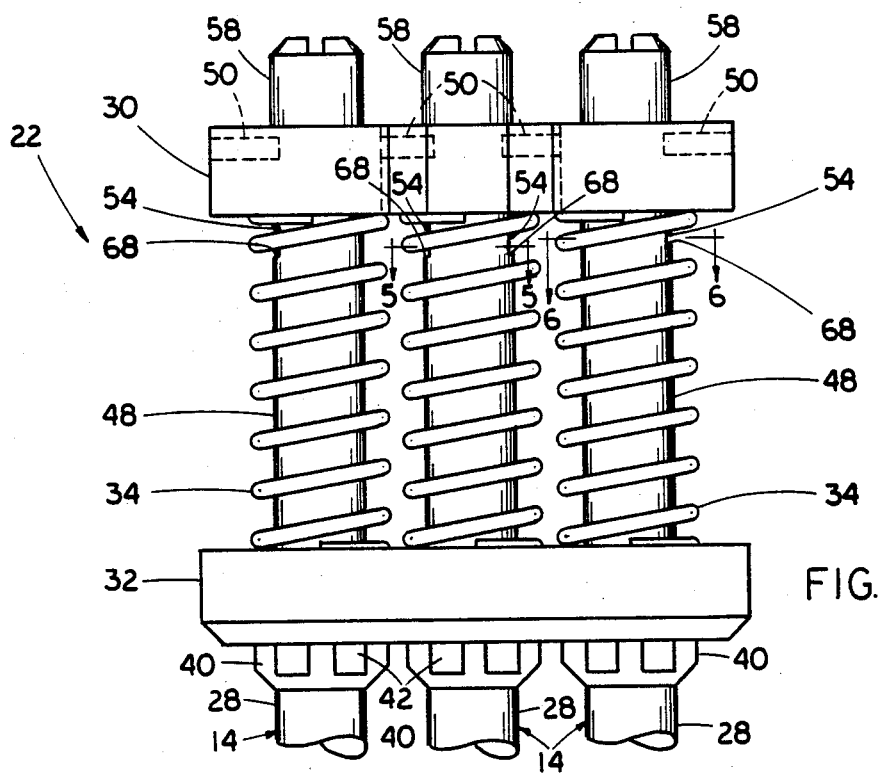
FIG. 3 is an enlarged fragmentary elevational view of the fuel assembly of FIG. 1, showing the components of the top nozzle.
Figure 4:
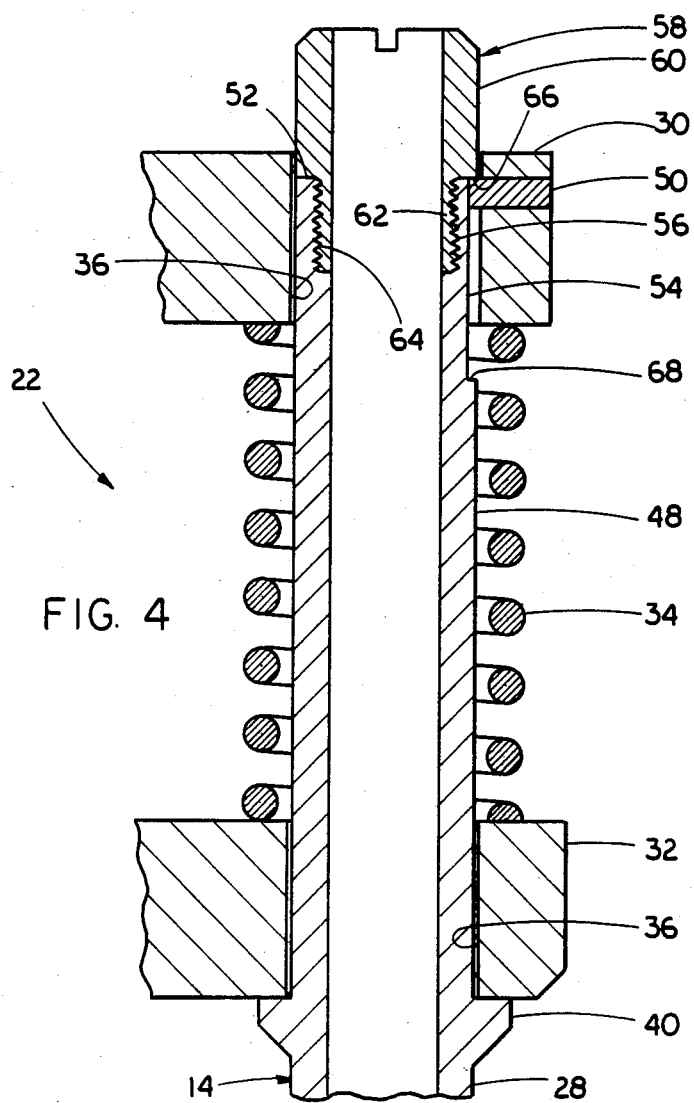
FIG. 4 is an enlarged fragmentary sectional view of the top nozzle of the fuel assembly as taken along line 4—4 of FIG. 2.
Figure 5:
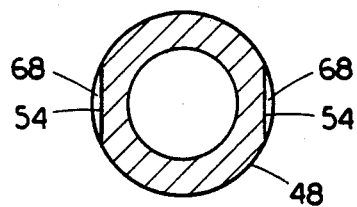
FIG. 5 is an enlarged sectional view as taken along line 5—5 of FIG. 3.
Figure 6:
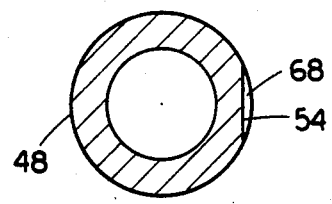
FIG. 6 is an enlarged sectional view as taken along line 6—6 of FIG. 3.

Referring now to FIGS. 2 to 4, there is shown some of the preexisting top nozzle attaching structure along as the modifications provided to it by the present invention which have made the top nozzle 22 easily removable and thereby the fuel assembly 10 readily reconstitutable. As designed heretofore, upper end portions 48 of the guide thimble extension members 28 each had an axially extending slot or recess (not shown) machined on the exterior thereof with upper and lower oppositely facing ledges. Also, the hold-down plate 30 had a plurality of inwardly-projecting pins 50 which each extended into one of the passageways 36 in the upper plate and one of the recesses on the extension members. The pins and upper ends or ledges of the recesses interacted to establish an upper limit to upward travel of the hold-down plate 30 and to support the weight of the fuel assembly during lifting. In view that this prior attaching structure has performed satisfactorily in reactor service, is relatively inexpensive to fabricate and has proven reactor experience, it is desirable to retain it in the improved removable attaching structure of the present invention.

The improved attaching structure makes the top nozzle 22 removable and the fuel assembly 10 reconstitutable by incorporating several modifications to the preexisting structure and by adding certain new parts thereto. First, the upper end portions 48 of the guide thimble tubular extension members 28 have been modified. They have been reduced in length so that the upper terminal edges 52 thereof now terminate at the tops of the recesses 54 which thereby have also been modified from their configuration heretofore. Also, the interior of the extension member upper end portions 48 now have threaded sections 56 defined thereon.

Further, a plurality of stop members 58 are incorporated by the improved attaching structure which each have upper and lower portions 60,62. Each stop member lower portion 62 has a threaded section 64 defined on its exterior which adapts it to threadably fit into the threaded section 56 of one of the extension member upper end portions 48. Also, each stop member upper portion 60 has an outside diameter greater than that of the lower portion 62 so as to form an overhanging ledge 66 on the stop member 58 at a transition between its upper and lower portions 60,62. The ledge 66 on each stop member 58 defines an upper end of one of the modified recesses 54 on the extension member upper end portions 48 when the stop member 58 is threaded thereon. Thus, the upper hold-down plate 30 is trapped between the ledge 66 on the removable stop member 58 and the lower end or ledge 68 of the recess 54 which ledge 68 is constructed the same as before.

Therefore, each pin 50 fixed such as by welding in the upper hold-down plate 30 is positioned to slide upwardly along the corresponding one recess 54 until making engagement with the ledge 66 on one of the stop members 58 when the stop member is threaded on the corresponding extension member upper end portion 48. In such manner, the pin 50 coacts with the stop member ledge 66 to limit upward movement of the hold-down plate 30 along the guide thimble 14. Also, each pin 50 is positioned to slide upwardly along and past the corresponding one recess 54 when the one stop member 58 has been unthreaded from the corresponding extension member upper end portion 48. In such way, removal of the upper hold-down plate 30 is allowed from the guide thimble 14.

In summary, therefore, to remove the top nozzle 22, the four upper stop members 58 are unthreaded for the guide thimble extension members 28, after which the hold-down plate 30, hold-down coil springs 34 and lower adapter plate 32 can be removed. A conventional fixture can be used to hold these components together during reconstitution of the fuel assembly 10.

Parenthetically, it will be noted that the upper portion 60 of each of the stop members 58 has an outside diameter substantially the same as that of the upper end portion 48 of each of the guide thimble extension members 28 which adapts the stop members to be slidably receivable in the upper hold-down plate passageways 36. It will also be noted in reference to FIGS. 2, 3, 5 and 6, that while there is one pin 50 and recess 54 associated with each of the four corner extension members 28, there is a pair of opposing pins 50 and recesses 54 associated with the middle or center extension member 28.

One additional advantage brought about by the improved attaching structure of the present invention is that it simplifies the adjustment of the engagement pins 50 during fabrication since they can now be preassembled to the hold-down plate 30 and then assembled onto the thimble extension members 28, rather than having to insert and locate the pins during final assembly.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a nuclear fuel assembly having at least one control rod guide thimble and a top nozzle, said guide thimble including an upper extension member, said top nozzle including an upper hold-down plate having a passageway slidably receiving an upper end portion of said extension member, an improved structure for removably attaching said upper hold-down plate on said guide thimble upper extension member, comprising:
   (a) means defining a recess on said upper end portion of said extension member;

(b) a stop member having upper and lower portions, said stop member lower portion adapted to connect onto and disconnect from said extension member upper end portion, said stop member upper portion having an outside diameter greater than that of said stop member lower portion and extending above said extension member upper end portion when said stop member lower portion is connected onto the same, said stop member also having a ledge formed thereon at a transition between its upper and lower portions which defines an upper limit of said recess when said stop member is connected onto said extension member upper end portion; and (c) an element mounted in said upper hold-down plate and extending therefrom into said passageway of said plate and said recess of said extension member upper end portion, said element being positioned to slide upwardly along said recess until making engagement with said ledge on said stop member when said stop member is connected onto said extension member upper end portion for limiting upward movement of said upper hold-down plate along said guide thimble, said element being positioned to slide upwardly along and past said recess when said stop member has been disconnected from said extension member upper end portion for allowing removal of said upper hold-down plate from said guide thimble.

2. The improved attaching structure as recited in claim 1, wherein said stop member upper portion has an outside diameter substantially the same as the outside diameter of said upper end portion of said guide thimble extension member which adapts said stop member upper portion to be slidably receivable in said upper hold-down plate passageway.

3. The improved attaching structure as recited in claim 1, wherein:
said upper end portion of said extension member has means defining a threaded section on the interior thereof;
said stop member lower portion has a complementary threaded section defined on the exterior thereof adapted to thread into said threaded section of said extension member upper end portion for releasably connecting said stop member into said guide thimble extension member.

4. The improved attaching structure as recited in claim 1, wherein said recess terminates at an upper terminal edge of said guide thimble extension member upper end portion.

5. In a nuclear fuel assembly having a plurality of control rod guide thimbles and a top nozzle, said guide thimbles each including an upper extension member, said top nozzle including an upper hold-down plate having a plurality of passageways slidably receiving upper end portions of said respective extension members of said guide thimbles, an improved structure for removably attaching said upper hold-down plate on said guide thimble upper extension members, comprising:

(a) means defining an axially extending recess on the exterior of said upper end portion of each of said guide thimble extension members, said recess terminating at an upper terminal edge of said extension member upper end portion;

(b) means defining a threaded section on the interior of said upper end portion of each of said guide thimble extension members;

(c) a plurality of stop members each having upper and lower portions, said each stop member lower portion having a threaded section defined on the exterior thereof adapted to thread into and unthread from said threaded section of one of said extension member upper end portions, said stop member upper portion having an outside diameter greater than that of said stop member lower portion, said stop member also having an overhanging ledge formed thereon at a transition between its upper and lower portions which defines an upper end of said recess on said one extension member upper end portion when said stop member is threaded therein; and (d) a plurality of elements mounted in said upper hold-down plate and each extending therefrom into one of said passageways of said plate and said recess of one of said extension member upper end portions, said each element being positioned to slide upwardly along said corresponding recess until making engagement with said ledge on one of said stop members when said stop member is threaded into said corresponding extension member upper end portion for limiting upward movement of said upper hold-down plate along said guide thimble, said each element being positioned to slide upwardly along and past said corresponding recess when said one stop member has been unthreaded from said corresponding extension member upper end portion for allowing removal of said upper hold-down plate from said guide thimble.

6. The improved attaching structure as recited in claim 5, wherein said upper portion of each of said stop members has an outside diameter substantially the same as the outside diameter of said upper end portion of each of said guide thimble extension members which adapts said each stop member upper portion to be slidably receivable in one of said upper hold-down plate passageways.

* * * * *